(12) United States Patent
Jang

(10) Patent No.: US 11,696,865 B2
(45) Date of Patent: Jul. 11, 2023

(54) ARTIFICIAL MUSCLE DEVICE AND WEARABLE ROBOT HAVING THE SAME

(71) Applicant: LG ELECTRONICS INC., Seoul (KR)

(72) Inventor: Dongseon Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 755 days.

(21) Appl. No.: 16/782,447

(22) Filed: Feb. 5, 2020

(65) Prior Publication Data

US 2021/0045954 A1 Feb. 18, 2021

(30) Foreign Application Priority Data

Aug. 16, 2019 (KR) .......................... 10-2019-0100231

(51) Int. Cl.
*A61H 1/02* (2006.01)
*B25J 9/10* (2006.01)
*H05B 3/00* (2006.01)

(52) U.S. Cl.
CPC .............. *A61H 1/02* (2013.01); *A61H 1/0292* (2013.01); *B25J 9/1075* (2013.01);
(Continued)

(58) Field of Classification Search
CPC ........ B25J 9/1075; B25J 9/1085; B25J 9/006; B25J 9/0006; A61F 2002/0894;
(Continued)

(56) References Cited

U.S. PATENT DOCUMENTS 11,085,426 B2 * 8/2021 Lima .......................... F03G 7/06
2010/0056966 A1 * 3/2010 Toth ........................ A61H 11/00
601/134

(Continued)

FOREIGN PATENT DOCUMENTS

KR 10-2016-0013663 A 2/2016
KR 10-1834970 B1 3/2018
(Continued)

OTHER PUBLICATIONS

English Translation, KR 2018009982A, http://espacenet.com, 2018 (Year: 2022).*

*Primary Examiner* — Philip R Wiest
*Assistant Examiner* — Nathan M Le
(74) *Attorney, Agent, or Firm* — Birch, Stewart, Kolasch & Birch, LLP

(57) ABSTRACT

Provided is an artificial muscle device, including a plurality of heat transfer modules including a thermal conductive body in which a plurality of tunnels parallel to each other and a thermoelectric element contacting an outer surface of the thermal conductive body, a connection member connecting a first heat transfer module to a second heat transfer module, the connection member being folded or unfolded according to a distance between the first heat transfer module and the second heat transfer module, a thermal reaction driving member passing through each of the tunnels, the thermal reaction driving member being stretched or contracted in a longitudinal direction of the tunnel according to a temperature of the thermal reaction driving member, and a power transmission part connected to an end of the thermal reaction driving member.

18 Claims, 16 Drawing Sheets

(52) U.S. Cl.
CPC .. *A61H 2201/123* (2013.01); *A61H 2201/165* (2013.01); *A61H 2201/1659* (2013.01); *H05B 3/0014* (2013.01)

(58) Field of Classification Search
CPC ........... A61F 2/50; A61H 1/02; A61H 1/0292; A61H 1/0244; A61H 1/12; A61H 2201/165; A61H 2201/123; A61H 2201/1659; A61H 2201/14; A61H 2201/1623; A61H 2201/1628; A61H 2201/1638; A61H 2201/1642; F03G 7/061; F03G 7/0614; F03G 7/06114; F03G 7/06143; F03G 7/06145; H05B 3/0014; H05B 3/0019
See application file for complete search history.

(56) References Cited

U.S. PATENT DOCUMENTS

| | | | |
|---|---|---|---|
| 2015/0065930 A1* | 3/2015 | Wyatt | A61H 11/00 601/150 |
| 2017/0157430 A1* | 6/2017 | Cheatham, III | A61N 2/008 |
| 2017/0157431 A1* | 6/2017 | Cheatham, III | A61N 1/36021 |
| 2018/0263839 A1* | 9/2018 | Lim | A61H 3/00 |
| 2019/0152052 A1 | 5/2019 | Park et al. | |

FOREIGN PATENT DOCUMENTS

| | | | | |
|---|---|---|---|---|
| KR | 20180099982 A | * | 9/2018 | B25J 9/00 |
| WO | WO-2018136004 A1 | * | 7/2018 | A61H 1/006 |

\* cited by examiner

ARTIFICIAL MUSCLE DEVICE AND WEARABLE ROBOT HAVING THE SAME

CROSS-REFERENCE TO RELATED APPLICATIONS

The present application claims priority under 35 U.S.C. 119 to Korean Patent Application No. 10-2019-0100231 filed on Aug. 16, 2019, which is hereby incorporated by reference in its entirety.

BACKGROUND

The present disclosure relates to an artificial muscle device using a principle of a thermal reaction driving material that is contracted or stretched according to an increase of a temperature and a wearable robot including the same.

The general robot rotates through rotation of a simple motor and gear for operation. Also, a driving mechanism using the electric motor requires a transmission mechanism, a reduction mechanism, and the like. As a result, the robot may be limited in implementation of lightweight and a flexible joint, and also, noise due to the rotation of the motor and the gear may occur.

To solve the above limitations, research on artificial muscles that simulate human muscles using artificial materials to perform mechanical operations have been conducted. Such an artificial muscle is mainly applied to wearable robots to assist the human body's movement.

However, the artificial muscle device according to the related art has the following limitations.

A prior art document 1 (KR 10-2016-0013663A) employs a method in which electricity is applied to a thermal reaction driving material to utilize joule heating, and an external cooling system and a circulation fluid are used to perform cooling. In this case, the joule heating method has limitations that a heat transfer design between the heat reaction driving materials is required, and the cooling system and the circulation fluid are not suitable for the wearable application because the system is large and heavy.

A prior art document 2 (KR 10-1834970B1) employs a method in which a heating system as well as a cooling system is provided in the outside to realize both heating and cooling through a circulation fluid. In this case, although there is an advantage that an insulation design is not necessary, and thus, a bundle of the thermal reaction driving materials is used in various forms, it is unsuitable for the wearable application because the entire system is large and heavy due to addition of an external heating system and an increase in complexity of a control of the circulation fluid.

SUMMARY

Embodiments of the present application provide a compact artificial muscle device and a wearable robot including the same.

Embodiments of the present application also provide an artificial muscle device that is easily controlled and has high reliability and a wearable robot including the same.

In one embodiment, an artificial muscle device includes: a plurality of heat transfer modules (i.e., assemblies) including a thermal conductive body in which a plurality of tunnels parallel to each other are provided and a thermoelectric element contacting an outer surface of the thermal conductive body; a connection member configured to connect one heat transfer module to the other heat transfer module, the connection member being folded or unfolded according to a distance between the one heat transfer module and the other heat transfer module; a thermal reaction driving member passing through each of the tunnels, the thermal reaction driving member being stretched or contracted in a longitudinal direction of the tunnel according to a temperature; and a power transmission part connected to an end of the thermal reaction driving member.

The thermal reaction driving member may be lengthily disposed in a first direction, and the heat transfer module may be lengthily disposed in a second direction perpendicular to the first direction.

The distance between the one heat transfer module and the other heat transfer module in the first direction may vary between a first distance and a second distance that is greater than the first distance, and a length of the heat transfer module in the first direction may be greater than the first distance and less than the second distance.

The thermal reaction driving member may include: an inner part disposed within the tunnel; and an outer part disposed between the one heat transfer module and the other heat transfer module, wherein the outer part may be disposed inside the connection member.

The thermal conductive body may include an insulation material.

The artificial muscle device may further include an insulation cover configured to cover one surface of the thermal conductive body and having thermal conductivity less than that of the thermal conductive body. The thermoelectric element may be disposed on the other surface of the thermal conductive body.

A portion of the plurality of heat transfer modules may be coupled to the power transmission part.

The plurality of heat transfer modules may be disposed to provide a plurality of rows and a plurality of columns in the first direction and the second direction.

The plurality of thermal reaction driving members may be disposed to provide a plurality of rows and a plurality of columns in the second direction and a third direction that is perpendicular to the first direction and the second direction.

One thermal reaction driving member may pass through the tunnel provided in one thermal conductive body, and the other thermal reaction driving member spaced apart from the one thermal reaction driving member in the third direction may pass through the tunnel provided in the other thermal conductive body spaced apart from the one thermal conductive body in the third direction.

In another embodiment, an artificial muscle device includes: a first artificial muscle that is stretched or contracted in a first direction; a second artificial muscle spaced apart from the first artificial muscle in the first direction; an intermediate power transmission part connected to the first artificial muscle and the second artificial muscle between the first artificial muscle and the second artificial muscle; a first power transmission part connected to an end of the first artificial muscle; and a second power transmission part connected to an end of the second artificial muscle. Each of the first artificial muscle and the second artificial muscle may include: a plurality of heat transfer modules including a thermal conductive body in which a plurality of tunnels parallel to each other are provided and a thermoelectric element contacting an outer surface of the thermal conductive body; a connection member configured to connect a first heat transfer module to a second heat transfer module, the connection member being folded or unfolded according to a distance between the first heat transfer module and the second heat transfer module; and a thermal reaction driving member passing through each of the tunnels, the thermal reaction driving member being stretched or contracted in a longitudinal direction of the tunnel according to a temperature.

In another embodiment, a wearable robot includes: a plurality of heat transfer modules including a thermal conductive body in which a plurality of tunnels parallel to each other are provided and a thermoelectric element contacting an outer surface of the thermal conductive body; a connection member configured to connect a first heat transfer module to a second heat transfer module, the connection member being folded or unfolded according to a distance between the first heat transfer module and the second heat transfer module; a thermal reaction driving member passing through each of the tunnels, the thermal reaction driving member being stretched or contracted in a longitudinal direction of the tunnel according to a temperature; a power transmission part connected to both ends of the thermal reaction driving member; a human body mounting part connected to the power transmission part and mounted on a human body; and a controller electrically connected to the thermoelectric element.

The thermal reaction driving member may be lengthily disposed in a first direction, and the heat transfer module may be lengthily disposed in a second direction perpendicular to the first direction. That is, the thermal reaction driving member may have a length extending in a first direction and the heat transfer module may have a length disposed in a second direction, the second direction may be perpendicular to the first direction.

The distance between the first heat transfer module and the second heat transfer module in the first direction may vary between a first distance and a second distance that is greater than the first distance, and a length of the heat transfer module in the first direction may be greater than the first distance and less than the second distance.

The thermal reaction driving member may include: an inner part disposed within the tunnel; and an outer part disposed between the first heat transfer module and the second heat transfer module, wherein the outer part may be disposed inside the connection member.

The thermal conductive body may include an insulation material.

The wearable robot may further include an insulation cover configured to cover one surface, which is adjacent to the human body, of both surfaces of the thermal conductive body and having thermal conductivity less than that of the thermal conductive body. The thermoelectric element may be disposed on the other surface of the thermal conductive body.

The plurality of heat transfer modules may be disposed to provide a plurality of rows and a plurality of columns in the first direction and the second direction.

The plurality of thermal reaction driving members may be disposed to provide a plurality of rows and a plurality of columns in the second direction and a third direction that is perpendicular to the first direction and the second direction.

One thermal reaction driving member may pass through the tunnel provided in a first thermal conductive body, and the other thermal reaction driving member spaced apart from the one thermal reaction driving member in the third direction may pass through the tunnel provided in a second thermal conductive body spaced apart from the one thermal conductive body in the third direction.

The details of one or more embodiments are set forth in the accompanying drawings and the description below.

Other features will be apparent from the description and drawings, and from the claims.

DETAILED DESCRIPTION OF THE EMBODIMENTS

Figure 1:
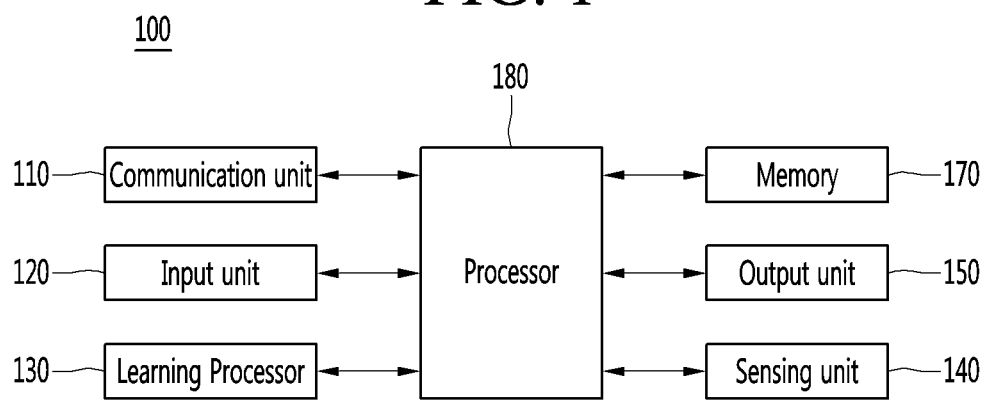
FIG. 1 illustrates an AI device 100 including a robot according to an embodiment.

Hereinafter, detailed embodiments will be described in detail with reference to the accompanying drawings.

With respect to constituent elements used in the following description, suffixes "module" and "unit" are given only in consideration of ease in the preparation of the specification, and do not have or serve as different meanings. Accordingly, the suffixes "module" and "unit" may be used interchangeably, and may be replaced with "assembly."

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the purpose or field of use.

The robot includes a driving unit (i.e., driving assembly), and the driving unit may include an actuator or a motor and may perform various physical operations, such as moving a robot joint. In addition, a movable robot may include a wheel, a brake, a propeller, and the like in a driving unit, and may travel on the ground through the driving unit or fly in the air.

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning may be used to mean deep learning.

FIG. 1 illustrates an AI device 100 including a robot according to an embodiment.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and an AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar (light detection and ranging), and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI device 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
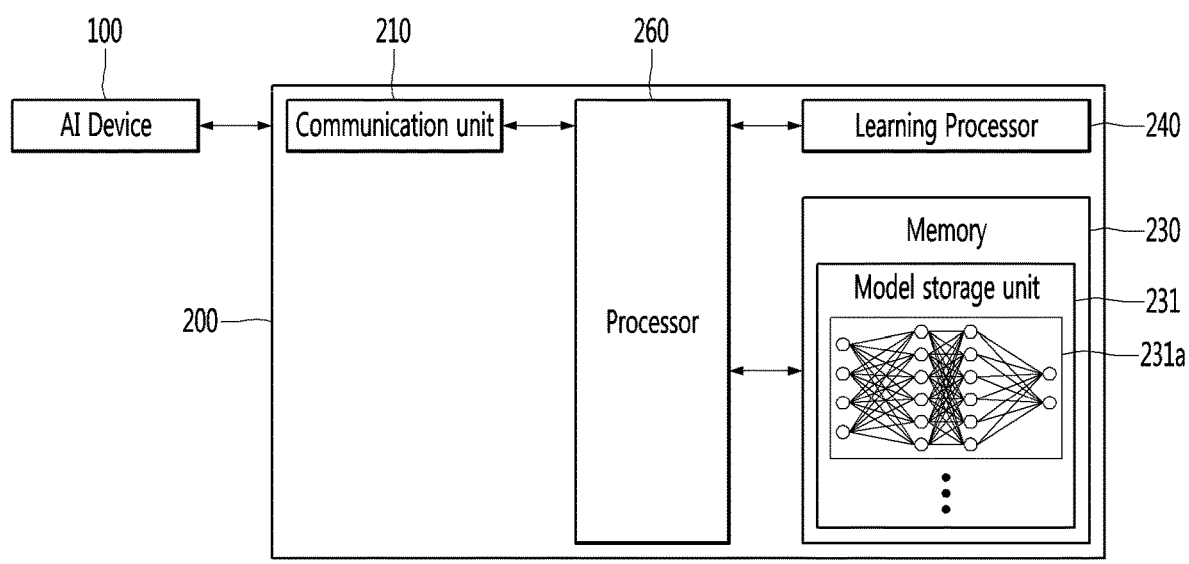
FIG. 2 illustrates an AI server 200 connected to a robot according to an embodiment.

FIG. 2 illustrates an AI server 200 connected to a robot according to an embodiment.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
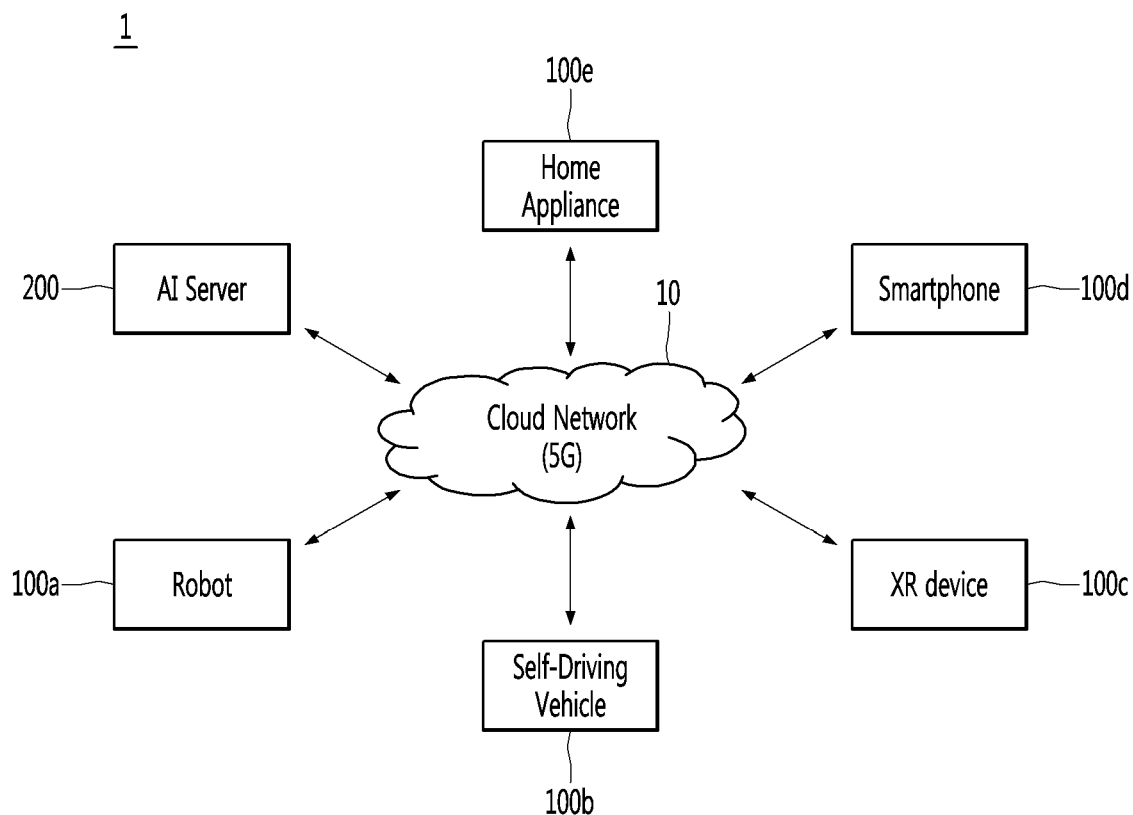
FIG. 3 illustrates an AI system 1 according to an embodiment.

FIG. 3 illustrates an AI system 1 according to an embodiment.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

Figure 4A:
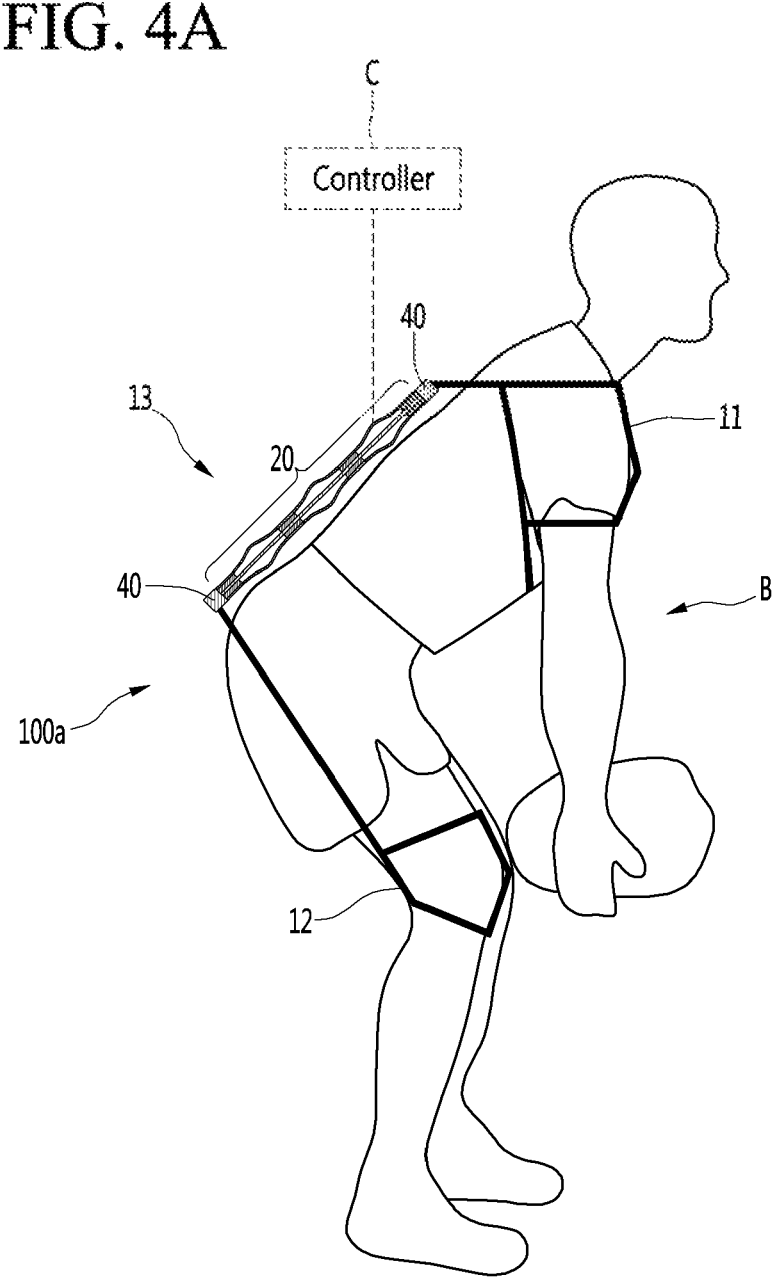
FIGS. 4A and 4B illustrate a wearable robot according to an embodiment.
Figure 4B:
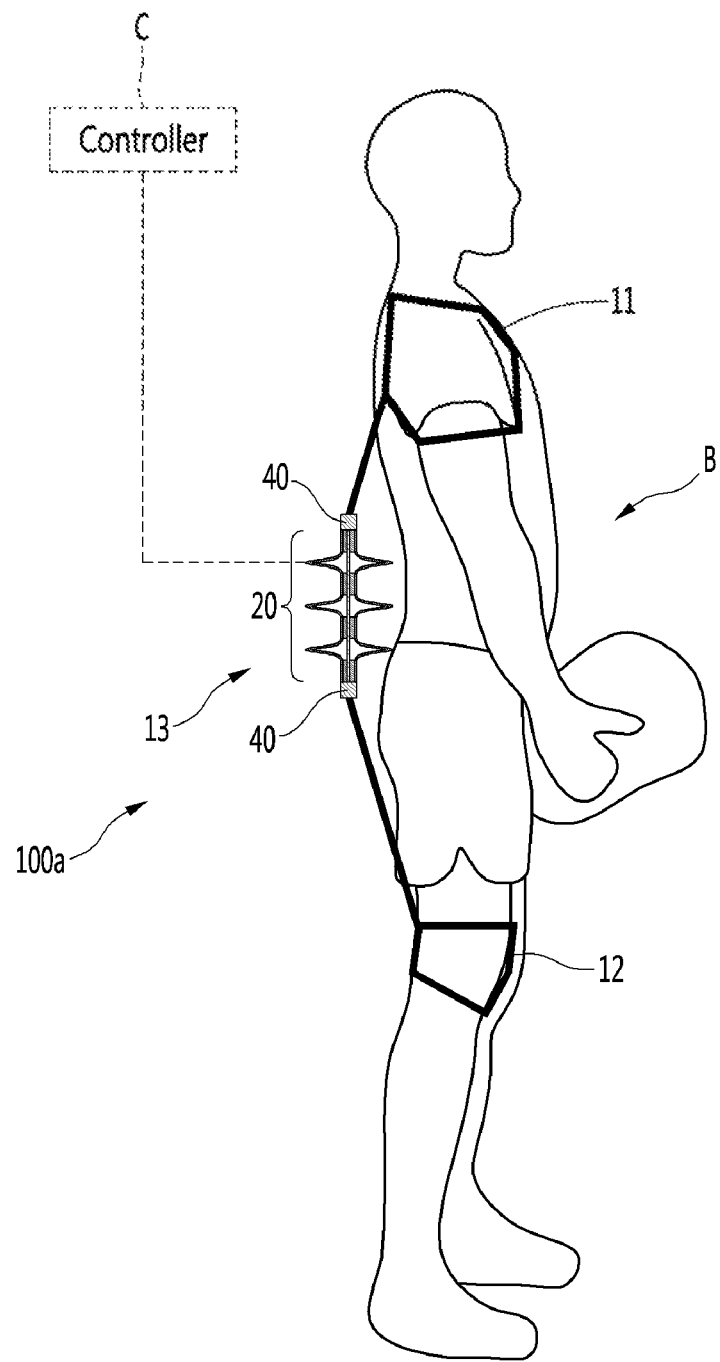

FIGS. 4A and 4B illustrate a wearable robot according to an embodiment.

A wearable robot according to an embodiment may be a constituent provided in the above-described robot 100a. The wearable robot assists muscle strength of the human body B to smoothly perform a specific operation.

The wearable robot 100a according to an embodiment may include human body mounting parts 11 and 12, an artificial muscle device 13, and a controller C.

The human body mounting parts 11 and 12 may be mounted on a human body B. A constituent configured to mount the human body mounting parts 11 and 12 on the human body B is not limited.

For example, the wearable robot 100a may assist waist strength. In this case, the human body mounting parts 11 and 12 may include a first human body mounting part 11 mounted on an upper body and a second human body mounting part 12 mounted on a lower body. In more detail, the first human body mounting part 11 may be mounted on an upper humeral portion of an arm or a shoulder, and the second human body mounting part 12 may be mounted on a thigh or knee of a leg.

When the wearable robot 100a assists the muscle strength of the waist, the artificial muscle device 13 may be disposed at a rear side of the waist or the back.

The artificial muscle device 13 may include an artificial muscle 20 that is stretched or contracted, and a power transmission part 40 connected to the artificial muscle 20.

The artificial muscle 20 may be stretched or contracted in one direction and may act as assistant force in the one direction. The power transmission part 40 that transmits the assistant force of the artificial muscle 20 to the outside may be connected to each of both ends of the artificial muscle 20 in the one direction.

The first human body mounting part 11 may be connected to the power transmission part 40 connected to one end of the artificial muscle 20. The second human body mounting part 12 may be connected to the power transmission part 40 connected to the other end of the artificial muscle 20.

The controller C may be electrically connected to the artificial muscle 20 to control the artificial muscle 20. In more detail, the controller C may control an amount and direction of current applied to a thermoelectric element 31 to be described later.

Hereinafter, an effect of the wearable robot will be briefly described with reference to the case in which the wearable robot assists the muscle strength of the waist.

As illustrated in FIG. 4A, the wearer of the wearable robot may grip an object by bending the upper body in the state in which the artificial muscle 20 is stretched.

As illustrated in FIG. 4B, when the artificial muscle 20 is contracted while a wearer picks up the object, contracting force of the artificial muscle 20 may be transmitted to the human body mounting parts 11 and 12 through the power transmission part 40. Thus, each of the human body mounting part 11 and 12 may pull the upper and lower body, and the waist may be stretched. Thus, the wearer may easily lift the heavy object while reducing a burden on the waist.

Figure 5:
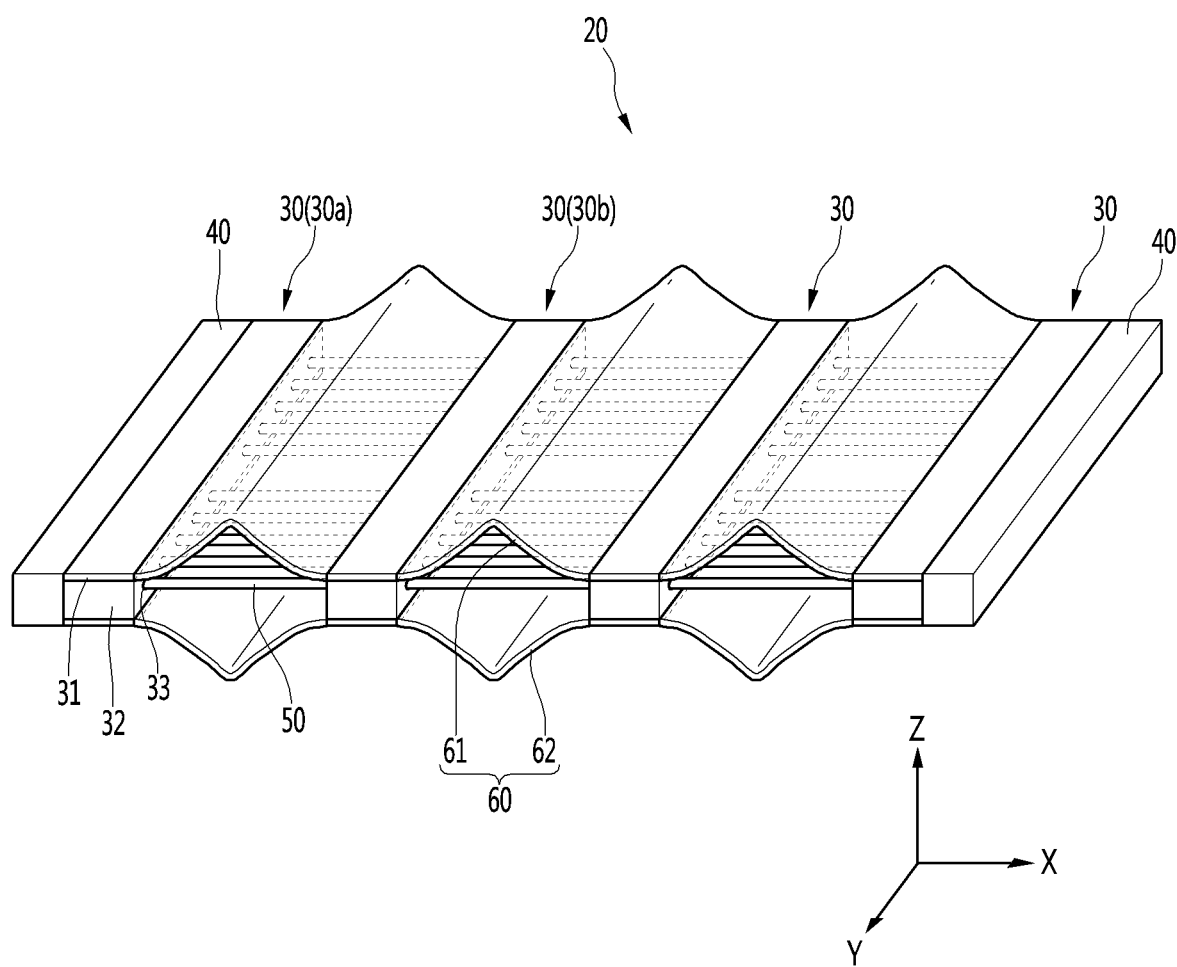
FIG. 5 illustrates a perspective view of an artificial muscle device according to a first embodiment.
Figure 6:
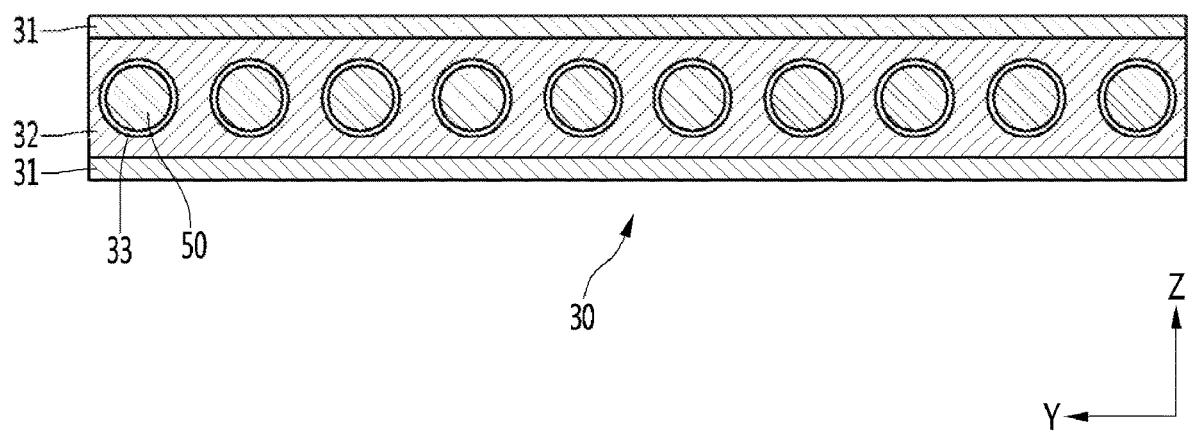
FIG. 6 illustrates a cross-sectional view of the artificial muscle device, taken about the y-axis of FIG. 5, according to the first embodiment.
Figure 7A:
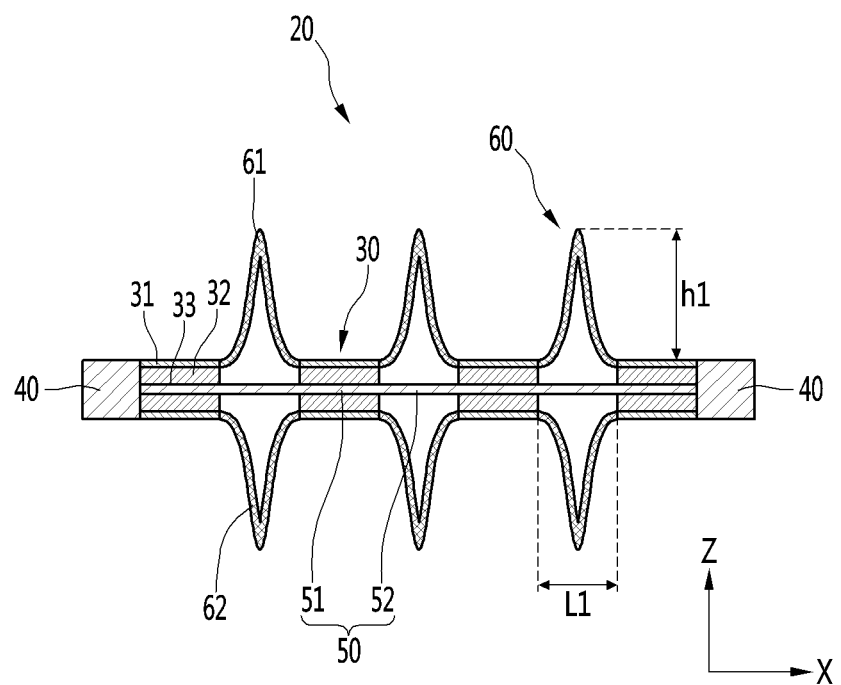
FIGS. 7A and 7B illustrate cross-sectional views of the artificial muscle device, taken about the x-axis of FIG. 5, according to the first embodiment, shown in a contracted state and a stretched state, respectively.
Figure 7B:
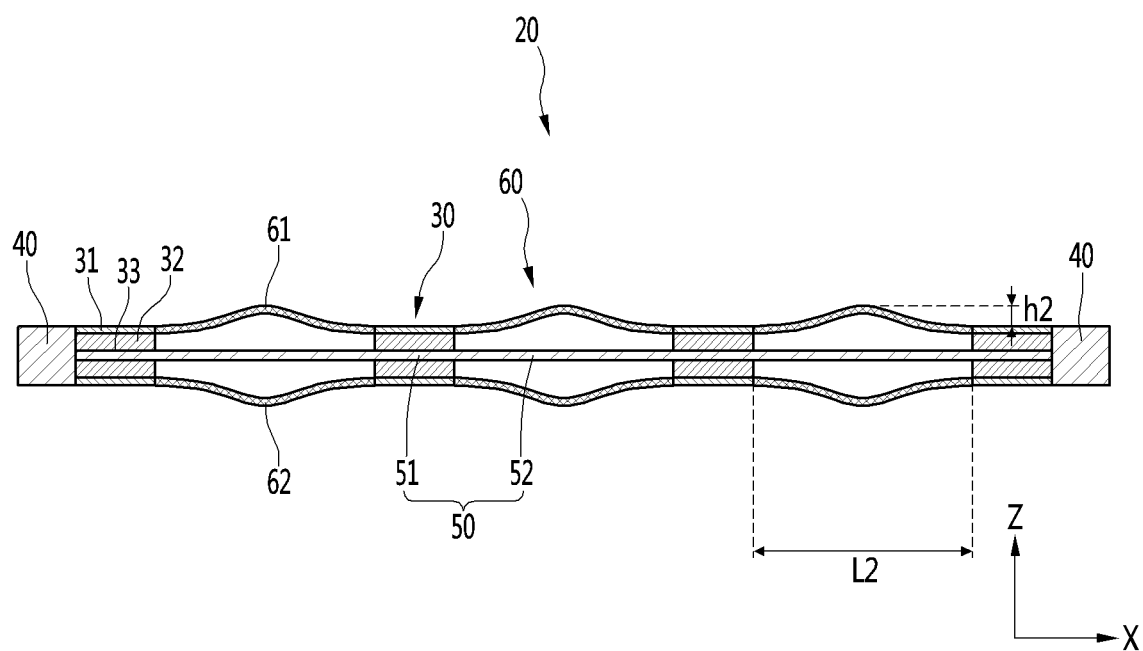
Figure 8A:
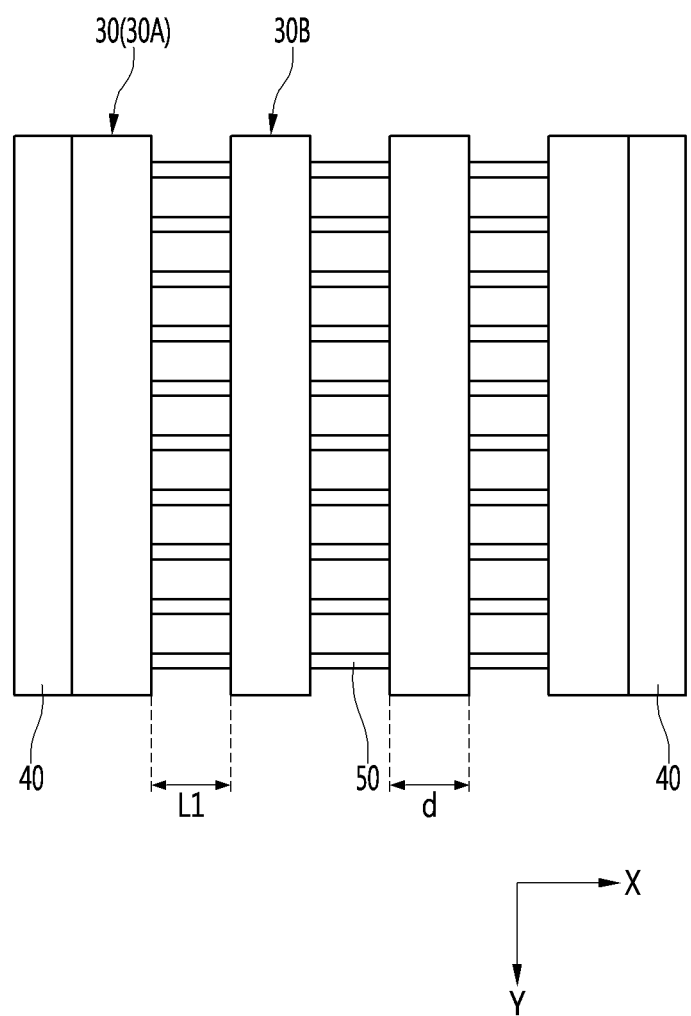
FIGS. 8A and 8B illustrate top views of the artificial muscle device according to the first embodiment.
Figure 8B:
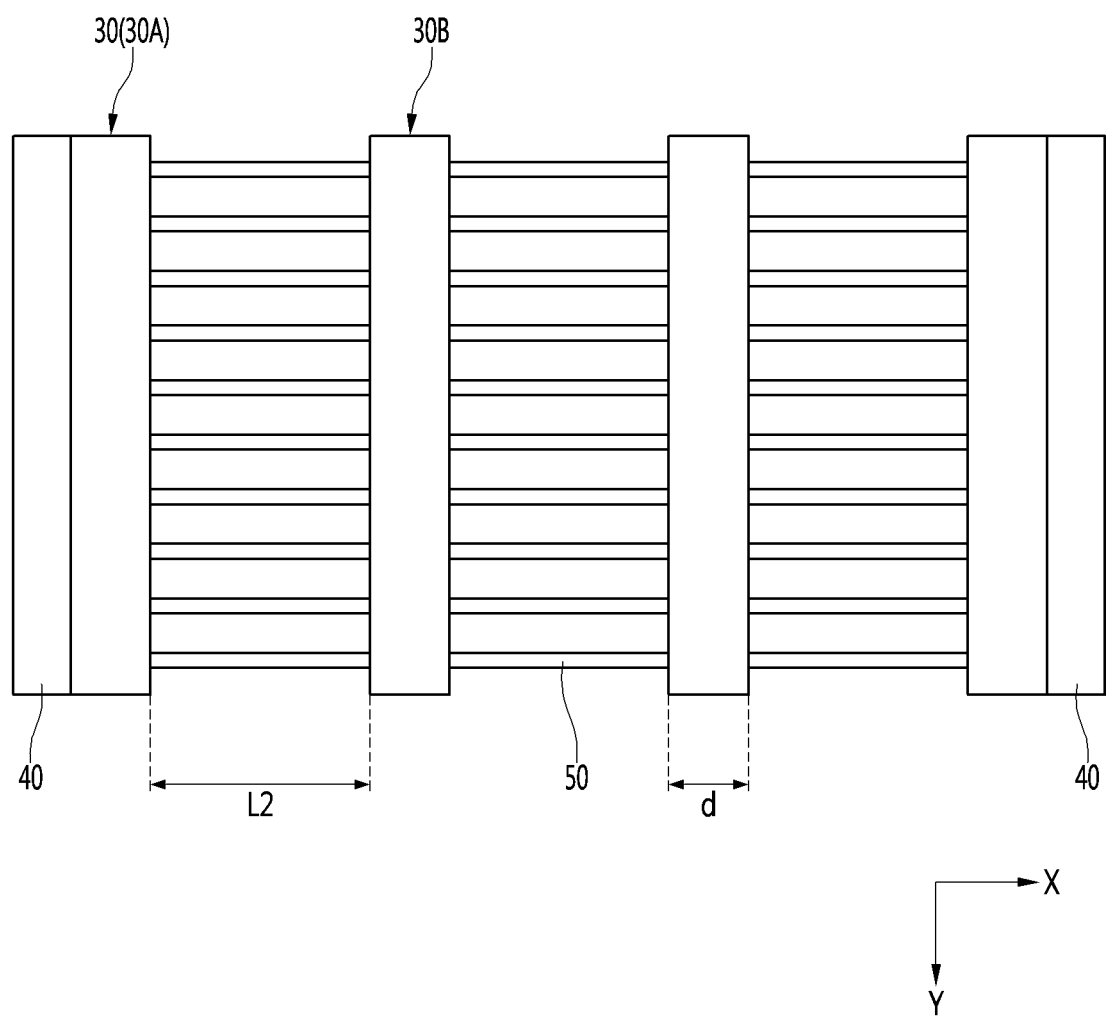

FIG. 5 illustrates a perspective view of an artificial muscle device 13 according to a first embodiment, FIG. 6 illustrates a cross-sectional view of the artificial muscle device 13, taken about the y-axis of FIG. 5, according to the first embodiment, FIGS. 7A and 7B illustrate cross-sectional views of the artificial muscle device 13, taken about the x-axis of FIG. 5, according to the first embodiment, shown in a contracted state and a stretched state, and FIGS. 8A and 8B illustrate top views of the artificial muscle device 13 according to the first embodiment.

As described above, an artificial muscle device 13 may include an artificial muscle 20 and a power transmission part 40 connected to the artificial muscle 20.

The artificial muscle 20 according to this embodiment may include a heat transfer module 30, a thermal reaction driving member 50, and a connection member 60.

The thermal reaction driving member 50 may be a shape memory alloy (SMA) and may be provided in plurality and spaced apart in the y-axis. For example, the thermal reaction driving member 50 may include at least one of nickel or titanium.

The thermal reaction driving member 50 may be lengthily disposed (i.e., have a length extending) in a first direction (parallel to an x-axis) and may be stretched or contracted in the first direction (parallel to the x-axis) according to a temperature (i.e., a change in temperature applied thereto). The first direction (parallel to the x-axis) may represent a direction parallel to the x-axis.

In more detail, the thermal reaction driving member 50 may be contracted when the temperature increases and may be stretched when the temperature decreases. A maximum stretching temperature and a maximum contracting temperature of the thermal reaction driving member 50 may be determined according to the material of the thermal reaction driving member 50. The maximum stretching temperature may represent a temperature at which the thermal reaction driving member 50 is maximally stretched, and the maximum contacting temperature may represent a temperature at which the thermal reaction driving member 50 is maximally contracted. For example, the maximum stretching temperature and the maximum contracting temperature of the thermal reaction driving member 50 may be determined according to a content of each of nickel and titanium contained in the thermal reaction driving member 50.

For example, when the temperature of the thermal reaction driving member 50 reaches about 40° C., the thermal reaction driving member 50 may be maximally contracted. When the temperature of the thermal reaction driving member 50 is below about 40° C., the thermal reaction driving member 50 may be stretched.

The thermal reaction driving member 50 may have a spring shape.

The power transmission part 40 may be connected to an end of the thermal reaction driving member 50. Thus, when the thermal reaction driving member 50 is contracted, the contracting force of the thermal reaction driving member 50 may be transmitted to the power transmission part 40.

Thermal reaction driving member 50 may be provided in plurality that are arranged side by side with each other. The plurality of thermal reaction driving members 50 may be spaced apart from each other in a second direction (parallel to a y-axis) that is perpendicular to the first direction (parallel to the x-axis). The second direction (parallel to the y-axis) may represent a direction parallel to the y-axis.

The heat transfer module 30 may support the thermal reaction driving member 50 and heat or cool the thermal reaction driving member 50. The heat transfer module 30 may be lengthily disposed (i.e., have a length extending) in the second direction (parallel to the y-axis).

The heat transfer module 30 may be provided in plurality that are arranged side by side with each other. The plurality of heat transfer modules 30 may be spaced apart from each other in the first direction (parallel to the x-axis).

In more detail, the heat transfer module 30 may include a thermoelectric element 31 and a thermal conductive body 32.

The thermoelectric element 31 may heat or cool the thermal conductive body 32 by using endothermic or exothermic reaction due to the Peltier effect. The thermoelectric element 31 may heat or cool the thermal conductive body 32 according to the direction of the current applied to the thermoelectric element 31. Since a structure and operation principle of the thermoelectric element 31 are well known techniques, detailed description thereof will be omitted.

The thermoelectric element 31 may contact an outer surface of the thermal conductive body 32. In more detail, one surface of the thermoelectric element 31 may contact the thermal conductive body 32, and a heat dissipation component may be disposed on the other surface of the thermoelectric element 31. The heat dissipation component may include at least one of a heat sink or a heat dissipation fan.

Thermoelectric elements 31 may be provided on each of both sides of the thermal conductive body 32. Thus, the heating and cooling of the thermal conductive body 32 may be quickly performed when compared to a case in which the heat conducting element 31 is provided only on one surface of the thermal conductive body 32. That is, the stretching or contracting of the thermal reaction driving member 50 may be performed quickly.

A tunnel 33 through which the thermal reaction driving member 50 passes may be provided in the thermal conductive body 32. The tunnel 33 may be provided to pass through the thermal conductive body 32 in the first direction (parallel to the x-axis).

A plurality of tunnels 33 spaced a predetermined from each other in the second direction (parallel to the y-axis) may be provided in the thermal conductive body 32. One thermal reaction driving member 50 may pass through each of the tunnels 33. The number of tunnels 33 provided in each thermal conductive body 32 may be the same as the number of thermal reaction driving members 50.

That is, each of the thermal reaction driving members 50 includes an inner part 51 disposed in the tunnel 33 of the thermal conductive body and an outer part 52 disposed between one heat transfer module 30 and the other heat transfer module 30.

The thermal conductive body 32 may include a material having high thermal conductivity. For example, the thermal conductive body 32 may include a metal material. For example, the thermal conductive body 32 may include at least one of aluminum, copper, iron, or a ceramic material.

Thus, the thermal reaction driving member 50 passing through the tunnel 33 of the thermal conductive body 32 may be quickly heated or cooled.

Therefore, when the thermoelectric element 31 cools the thermal conductive body 32, the temperature of the thermal reaction driving member 50 may decrease, and the thermal reaction driving member 50 may be stretched. On the other hand, when the thermoelectric element 31 heats the thermal conductive body 32, the temperature of the thermal reaction driving member 50 may increase, and the thermal reaction driving member 50 may be contracted.

For another example, only the cooling of the thermal reaction driving member 50 may be performed by the thermoelectric element 31, and the heating of the thermal reaction driving member 50 may be performed by joule heating. In this case, the thermal conductive body 32 may include an insulation material. For example, the thermal conductive body 32 may include an alumina (i.e., aluminum) material.

In more detail, the thermal reaction driving member 50 may be heated and contracted by the joule heating in which current is applied to the thermal reaction driving member 50, and the thermal conductive body 32 may insulate the thermoelectric element 31 from the current that is applied to the thermal reaction driving member 50.

The connection member 60 may connect the heat transfer modules 30 adjacent to each other to each other.

In more detail, the connection member 60 may connect one heat transfer module 30 to the other heat transfer module 30.

The connection member 60 preferably includes a fabric or a fabric material, but is not limited thereto. For example, the connection member 60 may include a flexible plastic material.

The connection member 60 may be folded or unfolded according to a distance between the one heat transfer module 30 and the other heat transfer module 30.

As illustrated in FIG. 7A, when the thermal reaction driving member 50 is contracted, a distance L1 between the one heat transfer module 30 and the other heat transfer module 30 may decrease. Therefore, the connection member 60 connecting the one heat transfer module 30 to the other heat transfer module 30 may be folded.

In more detail, the connection member 60 may be folded in the first direction (parallel to the x-axis) may protrude in a third direction (parallel to a z-axis) that is perpendicular to the first direction (parallel to the x-axis) and the second direction (parallel to the y-axis). The third direction (parallel to the z-axis) may represent a direction parallel to the z-axis. That is, a height h1 of the connection member 60 in the third direction (parallel to the z-axis) may be relatively high.

On the other hand, as illustrated in FIG. 7B, when the thermal reaction driving member 50 is stretched, a distance L2 between the one heat transfer module 30 and the other heat transfer module 30 may increase. Therefore, the connection member 60 connecting the one heat transfer module 30 to the other heat transfer module 30 may be unfolded.

In more detail, the connection member 60 may be unfolded in the first direction (parallel to the x-axis) and flattened in the third direction (parallel to the z-axis). That is, a height h2 of the connection member 60 in the third direction (parallel to the z-axis) may be relatively low.

The connection member 60 includes an upper connection member 61 connecting an upper portion of a first heat transfer module 30 to an upper portion of a second, adjacent heat transfer module 30 and a lower connection member 62 connecting a lower portion of the first heat transfer module 30 to a lower portion of the second heat transfer module 30.

The upper connection member 61 and the lower connection member 62 may be disposed at sides that are opposite to each other with respect to the thermal reaction driving member 50. That is, the thermal reaction driving member 50 may be disposed between the upper connection member 61 and the lower connection member 62 in the third direction (parallel to the z-axis) that is perpendicular to the first direction (parallel to the x-axis) and perpendicular to the second direction (parallel to the y-axis).

The outer part 52 of the thermal reaction driving member 50 may be disposed inside the connection member 60. In more detail, the outer part 52 of the thermal reaction driving member 50 may be disposed between the upper connection member 61 and the lower connection member 62.

As a result, the connection member 60 may protect the outer part 52 of the thermal reaction driving member 50 from the outside.

A portion of the plurality of heat transfer modules 30 may be coupled to the power transmission part 40. In more detail, the plurality of heat transfer modules 30 may include a first heat transfer module 30A coupled to the power transmission part 40 and a second heat transfer module 30B spaced apart from the power transmission part 40.

The first heat transfer module 30A may be a heat transfer module 30 disposed at the outermost side of the plurality of heat transfer modules 30. When the thermal reaction driving member 50 is stretched or contracted, the first heat transfer module 30a may move together with the power transmission part 40.

The second heat transfer module 30B may be a heat transfer module 30 disposed inside the first heat transfer module 30a among the plurality of heat transfer modules 30.

For example, the artificial muscle 20 may include a pair of first heat transfer modules 30a and a pair of second heat transfer modules 30b.

The heat or cold air transferred to the inner part 51 disposed in the tunnel 33 formed in the first heat transfer module 30a may be transferred to the outer part 52 in one direction adjacent to the first heat transfer module 30a. On the other hand, the heat or cold air transferred to the inner part 51 disposed in the tunnel 33 formed in the second heat transfer module 30b may be transferred to the outer part 52 in both directions adjacent to the second heat transfer module 30b.

That is, an amount of heat transferred between the first heat transfer module 30a and the thermal reaction driving device 50 when the thermoelectric element 31 has the same output may be different from that of heat transferred between the second heat transfer module 30b and the thermal reaction driving member 50. The controller C (see FIG. 4) may control each of the thermoelectric elements 31 by correcting the heat amount difference.

Thus, the first thermal conductive body 30a may move together with the power transmission part 40 to reliably control each of the thermoelectric elements 31.

As illustrated in FIGS. 8A and 8B, a distance between one heat transfer module 30 (i.e., a first heat transfer module 30) and another heat transfer module 30 (i.e., a second heat transfer module) in the first direction (parallel to the x-axis) may vary between the first distance L1 and the second distance L2. The second distance L2 may be greater than the first distance L1.

In more detail, when the heat transfer module 30 heats the thermal reaction driving member 50, a distance between the heat transfer modules 30 adjacent to each other may decrease up to the first distance L1 as illustrated in FIG. 8A.

On the other hand, when the heat transfer module 30 cools the thermal reaction driving member 50, a distance between the heat transfer modules 30 adjacent to each other may increase up to the second distance L2.

An amount of heat transferred to each thermal reaction driving member 50 may increase as the length in the first direction (parallel to the x-axis) of the heat transfer module 30 increases. Thus, a length d of the heat transfer module 30 in the first direction (parallel to the x-axis) may be greater than the first distance L1 and less than the second distance L2. As a result, an amount of heat exchanged between each thermal reaction driving member 50 and the heat transfer module 30 may sufficiently increase, and the artificial muscle device may be quickly stretched and contracted.

Also, since the thermal reaction driving member 50 passes through the tunnel 33 provided in the heat conduction body 32, the thermal reaction driving member 50 may be freely stretched or contracted without being constricted when the thermal reaction driving member 50 is stretched or contracted. Thus, even though the thermal conductive body 30 is sufficiently long in the first direction (parallel to the x-axis), the thermal reaction driving member 50 may be smoothly stretched.

If the thermal reaction driving member 50 is directly welded to the thermoelectric element 31 or the thermal conductive body 32, the portion of the thermal reaction driving member 50, which is welded to the thermoelectric element 31 or the thermal conductive body 32 may not be stretched or contracted. Thus, an area of the thermoelectric element 31 or the thermal conductive body 32 has be minimized to maximize a stretching ratio within a limited length of the artificial muscle device. In this case, the amount of heat transferred to the thermal reaction driving member 50 through the thermoelectric element 31 or the thermal conductive body 32 may be limited. On the other hand, the artificial muscle device according to an embodiment does not have this limitation.

Figure 9:
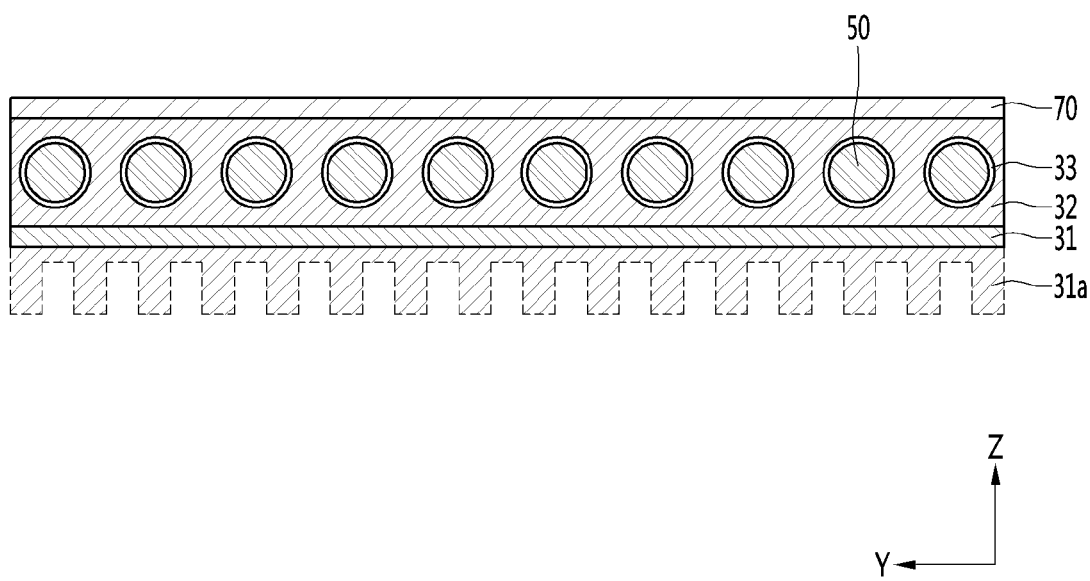
FIG. 9 illustrates a cross-sectional view of an artificial muscle device, taken about the y-axis, according to a second embodiment.

FIG. 9 illustrates a cross-sectional view of an artificial muscle device, taken along line x-axis, according to a second embodiment.

Hereinafter, contents duplicated with the foregoing first embodiment will be omitted, and differences will be mainly described.

An artificial muscle device according to this embodiment may further include an insulation cover 70 that covers one surface of a thermal conductive body 32 and has thermal conductivity less than that of the thermal conductive body 32.

In more detail, the insulation cover 70 may be provided on one surface of the thermal conductive body 32, and a thermoelectric element 31 may be provided on the other surface of the thermal conductive body 32. As described above, a heat dissipation component 31a may be provided in the thermoelectric element 31. The heat dissipation component 31a may include at least one of a heat sink or a heat dissipation fan.

The heat insulation cover 70 may be lengthily disposed (i.e., have a length extending in a second direction (parallel to a y-axis), like the thermal conductive body 32.

The insulation cover 70 may have low thermal conductivity to insulate the heat of the thermal conductive body 32. The insulation cover 70 may cover one surface of both surfaces of the thermal conductive body, which is adjacent to a human body B (see FIGS. 4A and 4B). Thus, the heat or cold air of the thermal conductive body 32 may be prevented from being transferred to the human body B.

Figure 10:
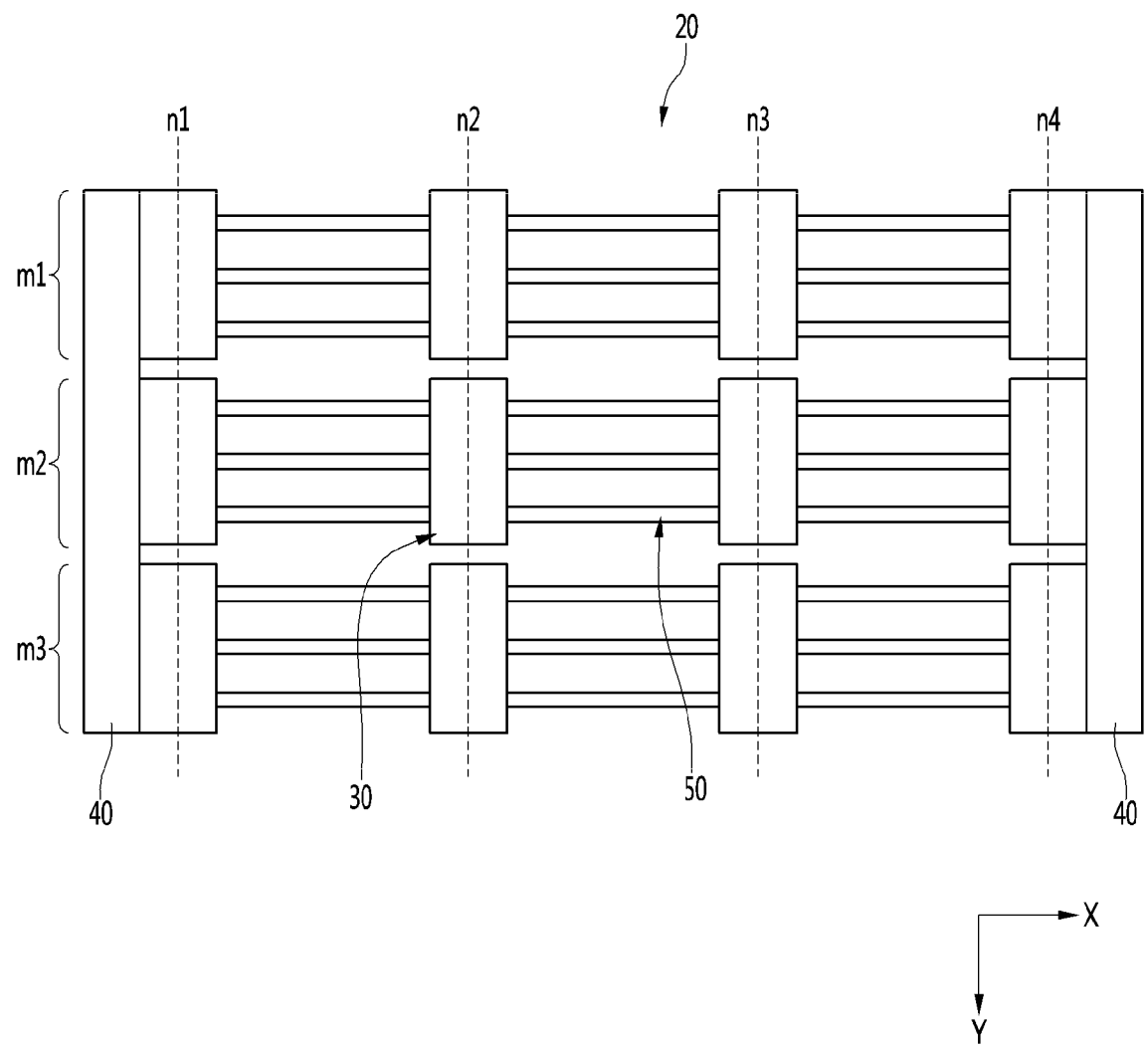
FIG. 10 illustrates a top view of an artificial muscle device according to a third embodiment.

FIG. 10 illustrates a top view of an artificial muscle device according to a third embodiment.

Hereinafter, contents duplicated with the foregoing first embodiment will be omitted, and differences will be mainly described.

In an artificial muscle device according to this embodiment, a plurality of heat transfer modules 30 may be spaced apart from each other not only in a first direction (parallel to an x-axis) but also in a second direction (parallel to a y-axis). In more detail, the plurality of heat transfer modules 30 may be disposed to provide a plurality of rows m1 to m3 and a plurality of columns n1 to n4 in the first direction (parallel to the x-axis) and the second direction (parallel to the y-axis). For example, the plurality of heat transfer modules 30 may be disposed to provide three rows and four columns.

Each of the thermal reaction driving members 50 may pass through the plurality of heat transfer modules 30 disposed in the same row.

The heat transfer modules 30 disposed in different rows may be spaced apart from each other in the second direction (parallel to the y-axis).

The number of thermal reaction driving members 50 connected to the heat transfer modules 30 disposed in different rows may be the same or different. For example, as illustrated in FIG. 10, three thermal reaction driving members 50 may be connected to the heat transfer modules 30 disposed in each of the rows m1 to m3.

The plurality of heat transfer modules 30 disposed in the first row n1 may be coupled to one power transmission part 40. The plurality of heat transfer modules 30 disposed in the last row n4 may be coupled to the other power transmission part 40.

The heat transfer modules 30 may be disposed as described above to secure flexibility in the second direction (parallel to the y-axis) of the artificial muscle device. Thus, the artificial muscle device may easily contact a large portion of the human body to improve wearability. Also, the artificial muscle device may maintain the close contact with the human body even though the human body is twisted.

On the other hand, in the artificial muscle device according to this embodiment, assistant force of the artificial muscle 20 may be adjustable. In more detail, a controller C (see FIGS. 4A and 4B) may control heating/cooling of all or a portion of the plurality of rows m1 to m3 to adjust the assistant force in the first direction (parallel to the x-axis) of the artificial muscle 20.

For example, the controller C may control heating of the heat transfer modules 30 disposed in the entirety of the plurality of rows m1 to m3. In this case, all the thermal reaction driving members 50 of the artificial muscle 20 may be contracted, and thus, the assistant force in the first direction (parallel to the x-axis) may be maximized.

For another example, the controller C may control heating of the heat transfer modules 30 disposed in the central row m2. In this case, only the thermal reaction driving members 50 connected to the heat transfer modules 30 in the central row m2 may be contracted, and thus, the assistant force in the first direction (parallel to the x-axis) may be relatively small.

For another example, the controller C may control heating of the heat transfer modules 30 disposed in the first row m1 and the last row m3. In this case, only the thermal reaction driving members 50 connected to the heat transfer module 30 disposed in the first row m1 and the last row m3 may be contracted, and thus, the assistant force in the first direction (parallel to the x-axis) may be relative small.

The artificial muscle device according to this embodiment may provide bending assistant force in the second direction (parallel to the y-axis). In more detail, the controller C may adjust the bending assistant force in the second direction (parallel to the y-axis) of the artificial muscle 20 by varying a degree of heating/cooling of the plurality of rows m1 to m3.

For example, the controller C may control heating of heat transfer module 30 disposed in the first row m1. In this case, only the thermal reaction driving member 50 connected to the heat transfer module 30 disposed in the first row m1 may be contracted, and thus, the artificial muscle 20 may be curved to be curved in a +y-axis direction.

For another example, the controller C may control heating of the heat transfer module 30 disposed in the last row m3. In this case, only the thermal reaction driving member 50 connected to the heat transfer module 30 disposed in the last row m3 may be contracted, and thus, the artificial muscle 20 may be bent to be curved in a −y axis direction.

Figure 11:
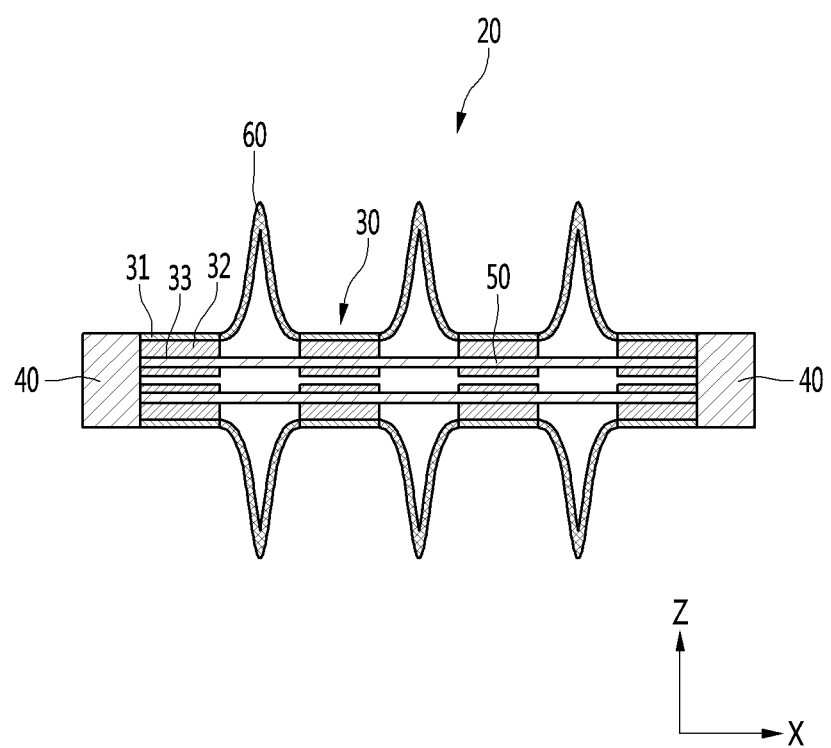
FIG. 11 illustrates a cross-sectional view of an artificial muscle device, taken about the x-axis, according to a fourth embodiment.
Figure 12:
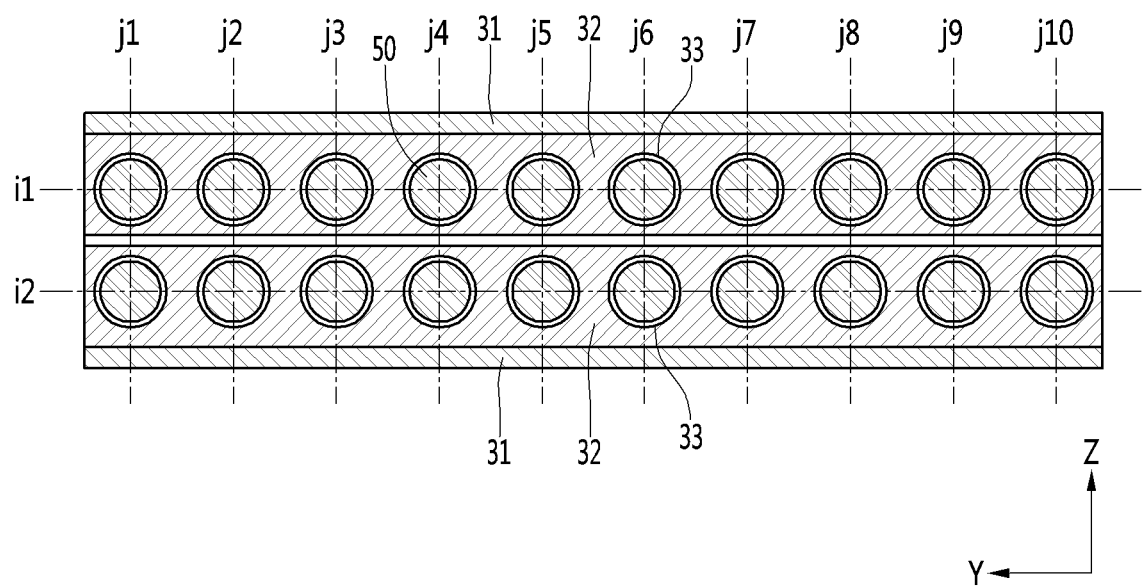
FIG. 12 illustrates a cross-sectional view of the artificial muscle device, taken about the y-axis, according to a fourth embodiment.

FIG. 11 illustrates a cross-sectional view of an artificial muscle device 20, taken about the y-axis, according to a fourth embodiment, and FIG. 12 illustrates a cross-sectional view of the artificial muscle device 20, taken about the x-axis, according to a fourth embodiment.

Hereinafter, contents duplicated with the foregoing first embodiment will be omitted, and differences will be mainly described.

In an artificial muscle device 20 according to the fourth embodiment, a plurality of thermal reaction driving members 50 may be spaced apart from each other not only in a second direction (parallel to a y-axis) but also in a third direction (parallel to a z axis). In more detail, the plurality of thermal reaction driving members 50 may be disposed to provide a plurality of rows i1 and i2 and a plurality of columns j1 to j10 in the second direction (parallel to the y-axis) and the third direction (parallel to the z-axis). For example, the plurality of thermal reaction driving members 50 may be disposed to provide two rows and ten columns.

Also, the plurality of thermal conductive bodies 32 may be spaced apart from each other not only in the first direction (parallel to the x-axis) but also in the third direction (parallel to the z-axis).

One thermal reaction driving member 50 may pass through a tunnel 33 provided in one thermal conductive body 30. The other thermal reaction driving member 50 spaced apart from the one thermal reaction driving member 30 in the third direction (parallel to the z-axis) may pass through a tunnel 33 provided in the other thermal conductive body 30 that is spaced apart from the one conductive body 30 in the third direction (parallel to the z-axis).

That is, the thermal reaction driving members 50 disposed in different rows may be connected to different thermal conductive bodies 32 that are spaced apart in the third direction (parallel to the z-axis).

The thermal conductive body 32 and the thermal reaction driving member 50 may be disposed as described above to secure flexibility in the third direction (parallel to the z-axis) of the artificial muscle device. Thus, the artificial muscle device may easily contact to a large portion of the human body to improve wearability. Also, the artificial muscle device may maintain the close contact with the human body even though the human body is twisted.

The artificial muscle device according to the fourth embodiment may provide bending assistant force in the third direction (parallel to the z-axis). In more detail, the controller C (see FIGS. 4A and 4B) may differently heat/cool the plurality of rows i1 and i2 to adjust the bending assistant force in the third direction (parallel to the z-axis) of the artificial muscle 20.

For example, the controller C may heat the thermal conductive body 32 to which the thermal reaction driving member 50 disposed in the first row i1 is connected. In this case, only the thermal reaction driving member 50 disposed in the first row i1 may be contracted, and thus, the artificial muscle 20 may be bent to be curved in a −z axis direction.

For another example, the controller C may heat the thermal conductive body 32 to which the thermal reaction driving member 50 disposed in the last row i2 is connected. In this case, only the thermal reaction driving member 50 disposed in the last row i2 may be contracted, and thus, the artificial muscle 20 may be bent to be curved in a +z-axis direction.

Figure 13:
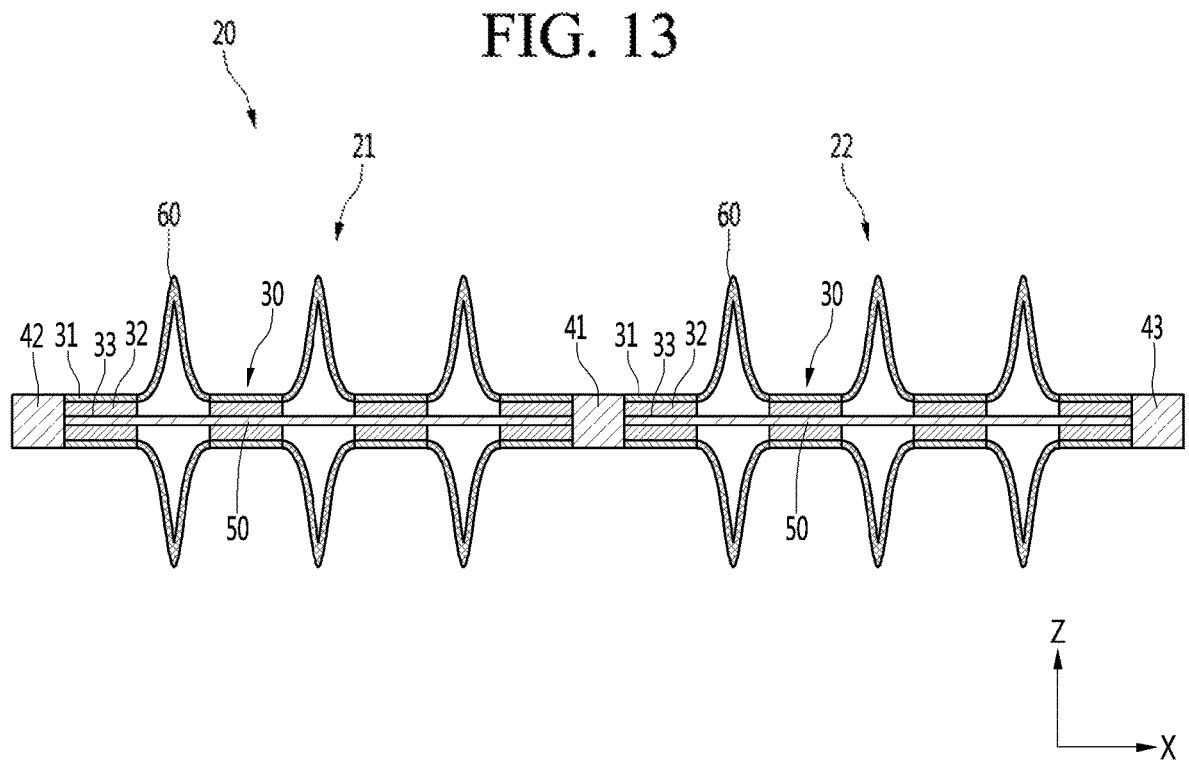
FIG. 13 illustrates a cross-sectional view of an artificial muscle device, taken about the x-axis, according to a fifth embodiment.

FIG. 13 illustrates a cross-sectional view of an artificial muscle device, taken about the x-axis, according to a fifth embodiment.

Hereinafter, contents duplicated with the foregoing first embodiment will be omitted, and differences will be mainly described.

An artificial muscle device 20 according to this embodiment may include a first artificial muscle 21, a second artificial muscle 22, an intermediate power transmission part 41, a first power transmission part 42, and a second power transmission part 42.

Each of the first artificial muscle 21 and the second artificial muscle 22 may have the same constituent as the artificial muscle 20 described according to the first embodiment. Thus, each of the first artificial muscle 21 and the second artificial muscle 22 may be stretched or contracted in a first direction (parallel to an x-axis) to act as assistant force in the first direction (parallel to the x-axis).

The intermediate power transmission part 41 may be disposed between the first artificial muscle 21 and the second artificial muscle 22. The first power transmission part 42 may be connected to an end of the first artificial muscle 21. The second power transmission part 43 may be connected to an end of the second artificial muscle 22.

In more detail, the intermediate power transmission part 41 may be connected to one end of the first artificial muscle 21, and the first power transmission part 42 may be connected to the other end of the first artificial muscle 21. Also, the intermediate power transmission part 41 may be connected to one end of the second artificial muscle 22, and the second power transmission part 43 may be connected to the other end of the second artificial muscle 22.

Human body mounting part that is mounted on different portions of a human body B (see FIGS. 4A and 4B) may be connected to the intermediate power transmission part 41, the first power transmission part 42, and the second power transmission part 43, respectively.

Also, in the artificial muscle device according to an embodiment of the present disclosure, assistant force may be selectively adjusted in the first direction (parallel to the x-axis). In more detail, a controller C (see FIGS. 4A and 4B) may individually control the first artificial muscle 21 and the second artificial muscle 22.

For example, the first artificial muscle 21 may provide an assistant force to the back of a user, and the second artificial muscle 22 may provide the assistant force to the waist of a user.

According to the embodiments, the thermal reaction driving member 50 may be cooled by the thermoelectric element. Thus, since a separate cooling system is not necessary, the artificial muscle device may be compact, easily controlled, and improved in operation reliability.

Also, the connection member may be folded or unfolded according to the distance between the one heat transfer module and the other heat transfer module. Thus, the connection member may reliably connect the heat transfer modules, which are adjacent to each other, to each other without interfering the contraction of the artificial muscle device.

Also, since the thermal reaction driving member passes through the tunnel provided in the thermal conductive body, the thermal reaction driving member may be freely stretched and contracted without being restricted by the thermal conductive body. Thus, the thermal conductive body may not be limited in size so that the size of the thermal conductive body sufficiently increases to quickly heat/cool the thermal reaction driving member.

Also, the outer part of the thermal reaction driving member, which is disposed outside the tunnel, may be disposed inside the connection member. Thus, the outer part may be protected from the outside.

Also, the thermal conductive body may include the insulation material. Thus, even though the thermal reaction driving member is heated in the joule heating manner, the thermoelectric element may not be short-circuited.

Also, the insulation cover may have low thermal conductivity and cover one surface of the thermal conductive body. Thus, the heat or cold air of the thermal conductive body may be prevented from being transferred to the human body.

Also, a portion of the plurality of heat transfer modules may be coupled to the power transmission part. Thus, the artificial muscle device may be more reliably controlled.

Also, the plurality of heat transfer modules may be disposed to provide the plurality of rows and the plurality of columns in the first direction and the second direction. Thus, the artificial muscle device may provide the bending assistant force in the second direction as well as the assistant force due to the extension/contraction in the first direction.

The thermal reaction driving members spaced apart from each other in the third direction may be respectively connected to the thermal conductive bodies spaced from each other in the third direction. Thus, the artificial muscle device may provide the bending assistant force in the third direction as well as the assistant force due to the extension/contraction in the first direction.

Also, the artificial muscle device may include the intermediate power transmission part connected between the first artificial muscle and the second artificial muscle. Thus, the artificial muscle device can selectively adjust assistant force according to the sections.

The above-disclosed subject matter is to be considered illustrative, and not restrictive, and the appended claims are intended to cover all such modifications, enhancements, and other embodiments, which fall within the true spirit and scope of the present disclosure.

Thus, the embodiment of the present disclosure is to be considered illustrative, and not restrictive, and the technical spirit of the present disclosure is not limited to the foregoing embodiment.

Therefore, the scope of the present disclosure is defined not by the detailed description of the disclosure but by the appended claims, and all differences within the scope will be construed as being included in the present disclosure.

What is claimed is:

1. An artificial muscle device, comprising:
   a plurality of heat transfer assemblies, each heat transfer assembly including:
      a thermal conductive body having a tunnel; and
      a thermoelectric element contacting a first outer surface of the thermal conductive body;
   a connection member unit connecting a first heat transfer assembly among the plurality of heat transfer assemblies to a second heat transfer assembly among the plurality of heat transfer assemblies, wherein the connection member unit is configured to be folded or unfolded according to a distance between the first heat transfer assembly and the second heat transfer assembly;
   a thermal reaction driving member unit passing through the tunnel of each heat transfer assembly, wherein the thermal reaction driving member unit is configured to expand and contract in the tunnel according to a temperature of the thermal reaction driving member unit; and
   a power transmission part connected to an end of the thermal reaction driving member unit,
   wherein the thermal reaction driving member unit has a length disposed in a first direction, and
   wherein the heat transfer assembly has a length disposed in a second direction, the second direction being perpendicular to the first direction.

2. The artificial muscle device according to claim 1, wherein a distance between the first heat transfer assembly and the second heat transfer assembly in the first direction varies between a first distance and a second distance, the second distance being greater than the first distance, and
   wherein a width of each heat transfer assembly in the first direction is greater than the first distance and is less than the second distance.

3. The artificial muscle device according to claim 1, wherein the heat transfer assemblies are spaced apart in the first direction and in the second direction.

4. The artificial muscle device according to claim 1, wherein the heat transfer assemblies are disposed in a plurality of rows in the first direction and a plurality of columns the second direction.

5. The artificial muscle device according to claim 1, wherein the thermal reaction driving member unit is among a plurality of thermal reaction driving member units, and
   wherein the thermal reaction driving member units are disposed in a plurality of rows in the second direction and a plurality of columns in a third direction, the third direction being perpendicular to the first direction and perpendicular to the second direction.

6. The artificial muscle device according to claim 5, wherein for each thermal conductive body, the tunnel is among a plurality of tunnels,
   wherein the thermal conductive bodies are spaced apart from each other in the first direction and in the third direction, and
   wherein for each thermal conductive body, each thermal reaction driving member unit passes through a respective tunnel among the plurality of tunnels.

7. The artificial muscle device according to claim 1, wherein the thermal reaction driving member unit includes:
   an inner portion disposed within each corresponding tunnel; and
   an outer portion disposed between the first heat transfer assembly and the second heat transfer assembly, and
   wherein the outer portion of the thermal reaction driving member unit is disposed inside of the connection member unit.

8. The artificial muscle device according to claim 1, wherein each heat transfer assembly further includes an insulation cover covering a second outer surface of the respective thermal conductive body, the insulation cover having a thermal conductivity less than that of the corresponding thermal conductive body, and
   wherein the second outer surface is different than the first outer surface.

9. The artificial muscle device according to claim 1, wherein the power transmission part is further connected to an end of a respective one of the heat transfer assemblies.

10. An artificial muscle device, comprising:
    a first artificial muscle that is stretched or contracted in a first direction;
    a second artificial muscle spaced apart from the first artificial muscle in the first direction;
    an intermediate power transmission part connected to the first artificial muscle and connected to the second artificial muscle, the intermediate power transmission part being located between the first artificial muscle and the second artificial muscle;
    a first power transmission part connected to an end of the first artificial muscle; and
    a second power transmission part connected to an end of the second artificial muscle, wherein each of the first artificial muscle and the second artificial muscle comprises:
a plurality of heat transfer assemblies including:
a thermal conductive body having a tunnel; and
a thermoelectric element contacting a first outer surface of the thermal conductive body;
a connection member unit connecting a first heat transfer assembly among the plurality of heat transfer assemblies to a second heat transfer assembly among the plurality of heat transfer assemblies, wherein the connection member unit is configured to be folded or unfolded according to a distance between the first heat transfer assembly and the second heat transfer assembly; and
a thermal reaction driving member unit passing through the tunnel of each heat transfer assembly, wherein the thermal reaction driving member unit is configured to expand and contract in the tunnel according to a temperature of the thermal reaction driving member unit,
wherein the thermal reaction driving member unit has a length disposed in the first direction, and
wherein the heat transfer assembly has a length disposed in a second direction, the second direction being perpendicular to the first direction.

11. A wearable robot, comprising:
a plurality of heat transfer assemblies, each heat transfer assembly including:
a thermal conductive body having a tunnel; and
a thermoelectric element contacting a first outer surface of the thermal conductive body;
a connection member unit connecting a first heat transfer assembly among the plurality of heat transfer assemblies to a second heat transfer assembly among the plurality of heat transfer assemblies, wherein the connection member unit is configured to be folded or unfolded according to a distance between the first heat transfer assembly and the second heat transfer assembly;
a thermal reaction driving member unit passing through the tunnel of each heat transfer assembly, wherein the thermal reaction driving member unit is configured to expand and contract in the tunnel according to a temperature of the thermal reaction driving member unit;
a power transmission part connected to an end of the thermal reaction driving member unit;
a human body mounting part connected to the power transmission part and configured to be mounted to a human body; and
a controller configured to control each thermoelectric element,
wherein the thermal reaction driving member unit has a length disposed in a first direction, and
wherein the heat transfer assembly has a length disposed in a second direction, the second direction being perpendicular to the first direction.

12. The wearable robot according to claim 11, wherein a distance between the first heat transfer assembly and the second heat transfer assembly in the first direction varies between a first distance and a second distance, the second distance being greater than the first distance, and
wherein a width of each heat transfer assembly in the first direction is greater than the first distance and is less than the second distance.

13. The wearable robot according to claim 11, wherein the heat transfer assemblies are spaced apart in the first direction and in the second direction.

14. The wearable robot according to claim 11, wherein the heat transfer assemblies are disposed in a plurality of rows in the first direction and a plurality of columns the second direction.

15. The wearable robot according to claim 11, wherein the thermal reaction driving member unit is among a plurality of thermal reaction driving member units, and
wherein the thermal reaction driving member units are disposed in a plurality of rows in the second direction and a plurality of columns in a third direction, the third direction being perpendicular to the first direction and perpendicular to the second direction.

16. The wearable robot according to claim 15, wherein for each thermal conductive body, the tunnel is among a plurality of tunnels,
wherein the thermal conductive bodies are spaced apart from each other in the first direction and in the third direction, and
wherein for each thermal conductive body, each thermal reaction driving member unit passes through a respective tunnel among the plurality of tunnels.

17. The wearable robot according to claim 11, wherein the thermal reaction driving member unit includes:
an inner portion disposed within each corresponding tunnel; and
an outer portion disposed between the first heat transfer assembly and the second heat transfer assembly, and
wherein the outer portion of the thermal reaction driving member unit is disposed inside of the connection member unit.

18. The wearable robot according to claim 11, wherein each heat transfer assembly further includes an insulation cover covering a second outer surface of the respective thermal conductive body, the insulation cover having a thermal conductivity less than that of the corresponding thermal conductive body, and
wherein the second outer surface is different than the first outer surface.

* * * * *